Nov. 1, 1960

D. E. THOMAS 2,958,824

AUTOMATIC DIRECT-READING TRANSISTOR
CUT-OFF FREQUENCY MEASURING SET

Filed Nov. 28, 1958

INVENTOR
D. E. THOMAS
BY R. B. Ardis
ATTORNEY

United States Patent Office 2,958,824
Patented Nov. 1, 1960

2,958,824

AUTOMATIC DIRECT-READING TRANSISTOR CUT-OFF FREQUENCY MEASURING SET

Donald E. Thomas, Madison, N.J., assignor to Bell Telephone Laboratories Incorporated, New York, N.Y., a corporation of New York Filed Nov. 28, 1958, Ser. No. 777,075

13 Claims. (Cl. 324—158)

This invention relates generally to the measurement of transistor frequency characteristics and more particularly, although in its broader aspects not exclusively, to the automatic measurement of junction transistor cut-off frequencies.

A principal object of the invention is to determine the frequency characteristics of the common emitter and common base short-circuit current gains of a junction transistor in as simple and economical a manner as possible.

Another and more particular object is to conduct the measurements required to determine the cut-off frequencies of a junction transistor at as low a frequency as possible.

Still another object of the invention is to permit simple automatic measurements of junction transistor cut-off frequencies.

In the past, such transistor parameters as $f_0$, the frequency at which the common emitter short-circuit gain is unity, and $f_a$, the so-called common base cut-off frequency, have generally been measured with the aid of relatively complex frequency sweep apparatus. Modern high frequency transistors may, however, have values of $f_0$ and $f_a$ of the order of 1000 megacycles or more. Consequently, the frequency sweep apparatus required for determining the values of $f_0$ and $f_a$ for such transistors tends not only to be highly complex but also to be somewhat inaccurate and difficult to operate. Stray capacities which would be insignificant at lower frequencies interfere seriously with successful operation and frequent adjustment of the equipment is usually necessary.

The present invention permits both $f_0$ and $f_a$ of a junction transistor to be determined in a simple manner with great accuracy at much lower frequencies. The transistor to be tested is connected in common emitter configuration between a variable frequency signal generator and a substantially short-circuit load resistance. The short-circuit collector current, which has a substantially constant slope in its frequency characteristic in the region above the transistor common emitter cut-off frequency, is then compared with a reference current derived simultaneously from the same signal generator through a reference circuit having a substantially constant loss-versus-frequency characteristic over a frequency range which includes at least a portion of the region of constant slope of the common emitter frequency cut-off of said transistor. Introduction of the correct amount of attenuation into the transistor path permits automatic reading of either $f_0$ or $f_a$, or both, when the operating frequency of the signal generator is changed until the two currents (as indicated by equal voltages across identical resistances) are equal.

One important embodiment of the invention includes the combination of a variable frequency signal generator with a pair of output paths, a detector in one output path, means connecting the transistor to be tested in common emitter configuration between the signal generator and a second detector in the other output path, and a servo motor driven by the difference between the two detector output voltages connected to change the frequency of the signal generator to the frequency at which the difference between the two voltages is substantially zero. The circuit is simple and rugged and, since it operates at frequencies considerably below those of $f_0$ and $f_a$, is not only highly accurate but also stable in its operation.

The invention will be more fully understood from the following detailed description of several specific embodiments. In the drawings.

Figure 1:
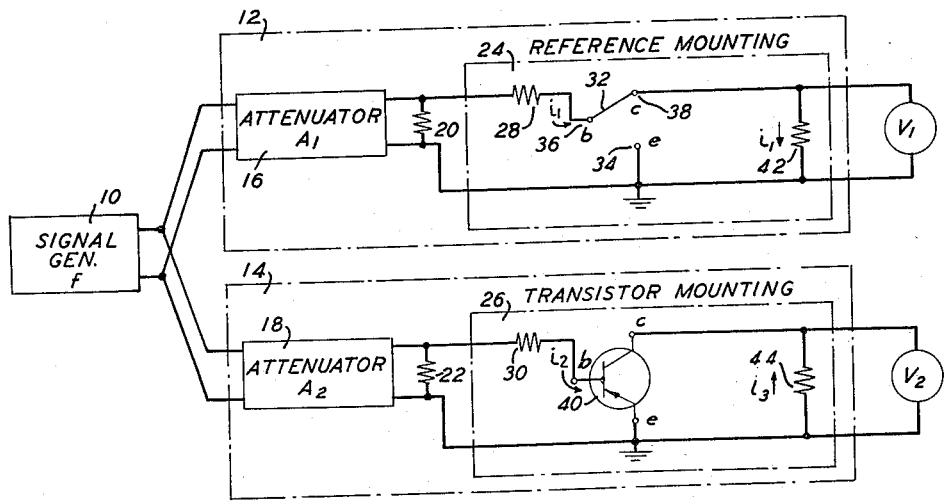
Fig. 1 shows the basic circuit used in measuring $f_0$ and $f_a$ in accordance with the present invention.

In Fig. 1 the output of a variable frequency signal generator 10 is fed through two parallel paths 12 and 14. Path 12 is a reference circuit, and path 14 is a circuit containing the transistor 40 having the cut-off frequency to be measured. Each circuit 12 and 14 includes a standard variable attenuator 16, 18 which is terminated in its characteristic resistance 20, 22. From the two attenuator terminations the signal is fed through two common-emitter transistor mountings 24 and 26 that are constructed as nearly alike as possible. Each mounting 24, 26 contains a resistor 28, 30 in series with the input which is sufficiently high compared to the common-emitter input impedance of the transistor 40 to be measured to assure substantially constant input currents $i_1$ and $i_2$ in the reference mounting 24 and transistor mounting 26, respectively. In the reference mounting, the base pin is shorted to the collector pin, as shown, and the emitter pin is grounded. The transistor 40 to be measured is inserted into transistor mounting 26. Each mounting 24, 26 contains an identical load resistor 42, 44. These load resistors 42 and 44 are sufficiently small with respect to the output impedance of transistor 40 that the load in each mounting 24, 26 is effectively a short circuit. Although conventional direct-current biasing is provided for transistor 40, it is omitted from Fig. 1 for the sake of simplicity.

The two parallel paths 12 and 14 are substantially identical in every respect and the attenuators 16 and 18 are set at the same value of attenuation. Therefore, $i_2 = i_1$ and the magnitude of the short-circuit common-emitter current gain of the transistor 40 is given by $$|\beta| = \frac{i_3}{i_2}$$

where $i_3$ is the current in the transistor load resistance 44. Since $$i_1 = i_2$$

then $$|\beta| = \frac{i_3}{i_1}$$

Since resistor 42 has the same magnitude as resistor 44, $$|\beta| = \left|\frac{V_2}{V_1}\right|$$

and $$20 \log |\beta| = 20 \log \left|\frac{V_2}{V_1}\right|$$

where $V_2$ is the voltage across resistor 42 and $V_1$ is the voltage across resistor 44. If the attenuators 16 and 18 are adjusted so that $|V_2|=|V_1|$ then $$20 \log |\beta| = A_2 - A_1$$

where $A_1$ is the loss in decibels of attenuator 16 and $A_2$ is the loss in decibels of attenuator 18.

Actually it is impossible to make the reference mounting 24 and the transistor mounting 26 absolutely identical, especially in the VHF and UHF regions. In order to correct for the difference in transmission of the two mountings, a correction factor is obtained. This correction factor is given by the difference as a function of frequency in the attenuator settings (designated $A_2' - A_1'$) required to give equal magnitudes of $V_1$ and $V_2$ with short circuits from base pin to collector pin in both mountings. If this correction factor, which in general varies with frequency $f$, is designated by $A'$, then $$A' = (A_2' - A_1') = F(f)$$

The corrected short-circuit current gain is then given in decibels by $$20 \log |\beta| = (A_2 - A_1) - A' \tag{1}$$

It can be shown that for most junction transistors the magnitude of the common-emitter current gain as a function of frequency, for frequencies less than $f_a$, is given by the expression $$20 \log |\beta| = 20 \log \left| \frac{\beta_0}{1+j\frac{f}{K(1-\alpha_0)f_a}} \right| \tag{2}$$

where $\beta_0$ is the low frequency common-emitter short-circuit current gain given by $$\frac{\alpha_0}{1-\alpha_0}$$

$\alpha_0$ is the low frequency common base short-circuit gain, $f_a$ is the common base cut-off frequency, i.e., the frequency at which the magnitude of the common base short-circuit current gain is 70.7% of the value at low frequencies, and $K$ is a constant for a particular code of transistor. Equation 2 defines a resistance-capacitance type cut-off characteristic which has a slope of 6 decibels per octave in the region where $$\left[ \frac{f}{K(1-\alpha_0)f_a} \right]^2 \gg 1$$

In this region $$|\beta| = \frac{\beta_0}{\frac{f}{K(1-\alpha_0)f_a}} = \frac{\beta_0 K(1-\alpha_0)f_a}{f}$$

but $$\beta_0 = \frac{\alpha_0}{1-\alpha_0}$$

Therefore $$|\beta| = \frac{\alpha_0 K f_a}{f}$$

That is, where $f$ is limited to frequencies in the 6 decibels per octave cut-off region, $$|\beta| = \frac{\alpha_0 K f_a}{f}$$

If $f_0$ is designated as the frequency at which the magnitude of $\beta$ is equal to unity, then $$|\beta| = 1 = \frac{\alpha_0 K f_a}{f_0}$$

$$f_0 = \alpha_0 K f_a$$

and $$f_\alpha = \frac{f_0}{\alpha_0 K}$$

since $$|\beta| = \frac{\alpha_0 K f_a}{f}$$

in the 6 decibels per octave region and $\alpha_0 K f_a = f_0$, then $$|\beta| = \frac{f_0}{f}$$

in the 6 decibels per octave region and $$20 \log |\beta| = 20 \log \frac{f_0}{f}$$

From Equation 1

$$20 \log |\beta| = A_2 - A_1 - A'$$

$$20 \log \frac{f_0}{f} = A_2 - A_1 - A'$$

and $$f_0 = f \frac{\text{antilog} \frac{A_2 - A_1}{20}}{\text{antilog} \frac{A'}{20}} \tag{3}$$

From Equation 3 it can be seen that the common-emitter unity gain $f_0$, sometimes called the common-emitter zero gain crossover frequency, can be calculated from the known values of $(A_2 - A_1)$, $A'$, and $f$ provided that $A_2$ has been so chosen that $f$ falls in the 6 decibels per octave cut-off region.

It should be noted that the same results may be achieved by setting the oscillator at a fixed frequency and varying the attenuation. By means of Equation 3, $f_0$ can be calculated directly. It should also be noted that the range of variation of $A_1$ includes zero attenuation and that only parallel path 14 need contain an attenuator.

Figure 2:
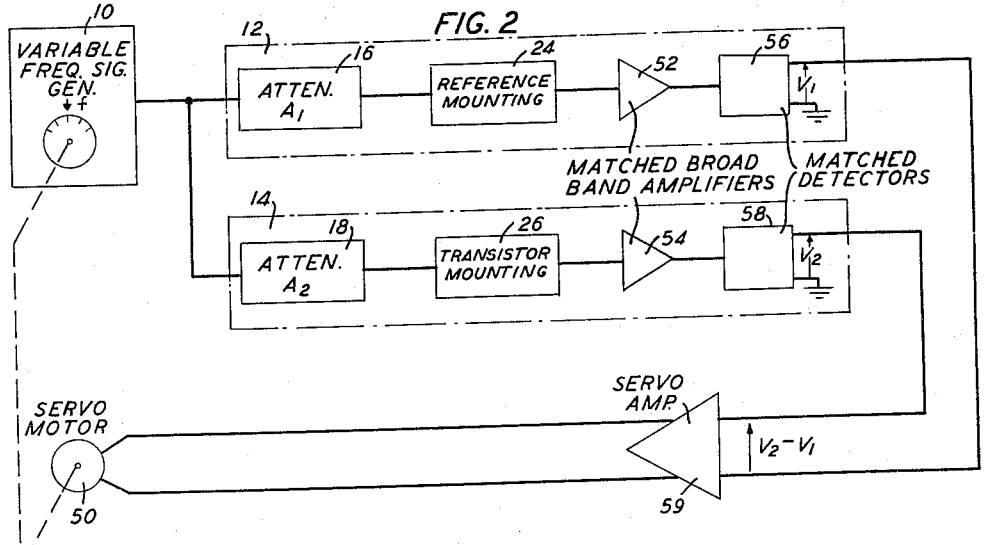
Fig. 2 shows an embodiment of the invention for measuring automatically the several junction transistor cut-off frequencies.
Figure 2:
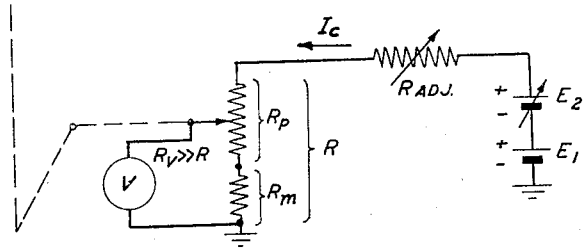

One specific embodiment of the present invention for determining the common-emitter and common-base cut-off frequencies of a junction transistor is shown in Fig. 2. The circuit of Fig. 2 contains the basic circuits of Fig. 1 but the frequency setting of the signal generator 10 is now controlled by the rotation of a mechanically coupled servo motor 50. The signal generator is fed into the two parallel paths 12 and 14 the first path containing the reference $(A_1)$ attenuator 16 and reference mounting 24, and the second containing attenuator $(A_2)$ 18 and transistor mounting 26. These parallel paths are continued through matched broadband amplifiers 52, 54 and matched detectors 56, 58 which produce two direct-current voltages designated $V_1$ and $V_2$ respectively. The differential voltage between $V_1$ and $V_2$ is then fed into the balanced input of a servo amplifier 59 driven by a direct-current chopper which yields an alternating-current voltage in response to the difference between two direct-current inputs. The servo amplifier output is fed to the control winding of a servo motor 50 which in turn drives the frequency control dial of the signal generator 10 and the movable contact of a cut-off frequency read-out potentiometer 62.

The correction factor $A'$ for the difference in transmission of the two parallel paths is obtained before automatic transistor measurements can be made. To determine $A'$ the mechanical coupling between the servo motor 50 and the signal generator 10 frequency control is opened. The base and collector pins are shorted to one another in both the reference 24 and transistor mounting 26. Attenuator 16 is then set at any convenient value. The difference between $A_1$ and $A_2$ to make $V_2$ equal to $V_1$ is then determined as a function of frequency for the entire range of frequencies covered by a single range of the signal generator 10. This difference is the correction factor $A' = (A_2' - A_1')$. The transistor to be tested is then placed in the transistor mounting 26. All elements in the reference path with the exception of attenuator 16 remain unchanged from the correction calibration condition. Reference attenuator 16 is set at a fixed value to be discussed later. The servo motor is recoupled to the signal generator frequency control dial and the servo system energized. The servo motor 50 then drives the oscillator to a frequency at which the input to the servo amplifier is zero, i.e., $V_2 = V_1$ and in accordance with Equation 3

$$f_0 = f \frac{\text{antilog} \frac{A_2 - A_1}{20}}{\text{antilog} \frac{A'}{20}} \quad (3)$$

Figure 3:
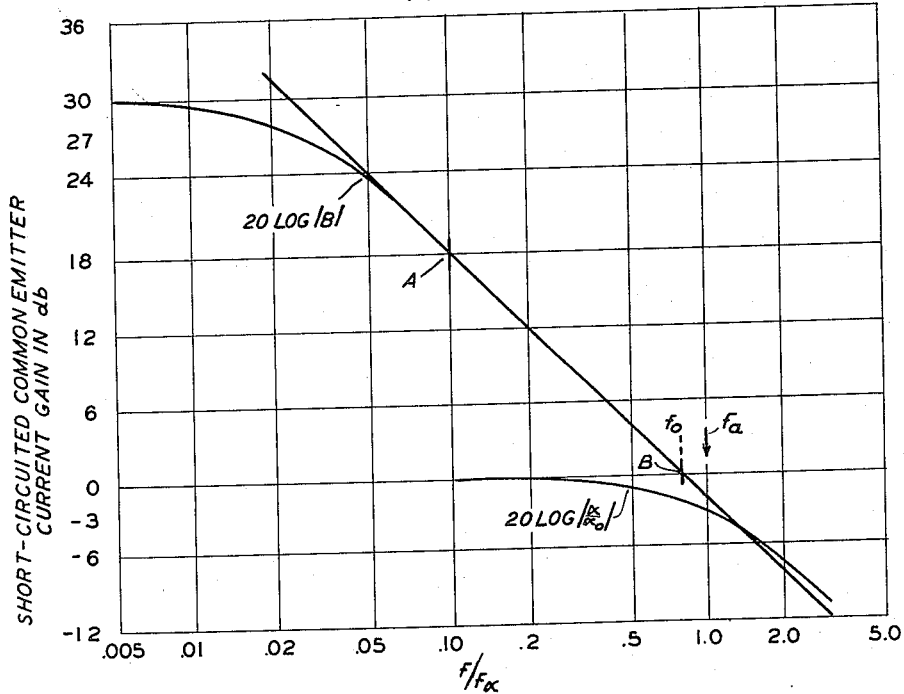
Fig. 3 illustrates the manner in which the magnitude of the short-circuit common emitter and common base current gains of a junction transistor vary with frequency.

The maximum value of $A_2 - A_1$ depends on the value of $\alpha_0$ of the transistors to be tested. A typical curve of junction transistor common-emitter short current gain magnitudes versus $$\frac{f}{f_\alpha}$$

is shown in Fig. 3. This curve can be obtained from either experimental results or mathematical analysis. In order for the apparatus to operate properly it is necessary that $A_2 - A_1$ be of such a maximum value that the frequency $f$ is such that the transistor is operating on the 6 decibels per octave cut-off slope (the line AB on Fig. 3) when $V_1 = V_2$. If antilog $$\frac{A'}{20}$$

is close to unity, as it will be in most instances, then for transistors with $\alpha_0$ greater than 0.97 ($A_2 - A_1$), can be made as high as eighteen decibels and still be on the six decibels per octave cut-off frequency, as shown in Fig. 3. For transistors with $\alpha_0$ greater than 0.97 and ($A_2 - A_1$) set at eighteen decibels, frequencies of unity common-emitter short circuit gain of the order of $8 \times 400$ megacycles or 3200 megacycles can be conveniently measured with signal generator frequencies no higher than 400 megacycles. This can be shown from Equation 3

$$f_0 = f \frac{\text{antilog} \frac{A_2 - A_1}{20}}{\text{antilog} \frac{A'}{20}} \quad (3)$$

Since it is anticipated that $$\frac{A'}{20}$$

will be somewhat near unity, $$f_0 = f \frac{\text{antilog} \frac{18}{20}}{1}$$

$f_0 = f$ (antilog 0.9)
$f_0 = 8f$
$f_0 = 8 \times 400$ megacycles $= 3200$

In a specific automatic production line setup it must be known that a $\alpha_0$ exceeds a given minimum in order that $A_2 - A_1$ can be chosen so that the transistor is always operating in the 6 decibels per octave cut-off region.

From Equation 3 $f_0$ is determined for $A_2 - A_1$ constant. Suitable direct visual read-out and automatic read-out for curve plotting is obtained as follows. The signal generator frequency $f$ is not, in general, a linear function of the angular position of the frequency control shaft. If the angular position of the servo system is designated $\theta$ with $\theta = 0$ at the minimum signal generator frequency and increasing as frequency increases, then $$f = f_m + F_1(\theta)$$

where $f_m$ is the minimum frequency and $F_1(\theta)$ is an experimentally obtainable function.

$A'$ is a function of frequency and, therefore, antilog $$\frac{A'}{20}$$

is a function of frequency $f$. Since $f$ is a function of $\theta$, antilog $$\frac{A'}{20}$$

can be written $$\frac{1}{\text{antilog} \frac{A'}{20}} = F_2(\theta)$$

Now designate antilog $$\frac{A_1 - A_2}{20}$$

as $K_g$. Then from Equation 3

$$f_0 = f \frac{K_g}{\text{antilog} \frac{A'}{20}}$$

and, since $f = f_m + F_1(\theta)$, $$f_0 = K_g \frac{f_m + F_1(\theta)}{\frac{1}{F_2(\theta)}}$$

$$f_0 = K_g [f_m + F_1(\theta)] F_2(\theta)$$

or $$f_0 = K_g [f_m + F_3(\theta)]$$

where $$F_3 \theta = F_2(\theta)[f_m + F_1(\theta)] - f_m$$

Now by adding fixed loss to one of the parallel paths 12, 14 of Fig. 2, $F_2(\theta)$ can be made equal to unity at any signal frequency and this is done at $f = f_m$. This will assure that $F_3(\theta)$ is always positive unless there is a very rapid change of $A'$ with frequency. Now, $$\left. \begin{array}{l} F_3(\theta) = f_m + F_1(\theta) - f_m \\ \text{and} \\ F_3(\theta) = F_1(\theta) \end{array} \right\} f = f_m$$

The read-out potentiometer 62 of Fig. 2 is constructed so that $$K_R R = K_R R_m + K_R R_P = f_m + F_3(\theta) = \frac{f_0}{K_g} \quad (4)$$

where $K_R$ is a design constant and $R_m$ is a fixed resistance. This can be done since: $F_3(\theta)$ is a fixed determinable function of frequency which will, in general, be monotonic (i.e., the first derivative always has the same sign), $F_3(\theta)$ is always positive, and potentiometers whose resistance is any reasonable monotonic function of angular position are available. Then $$f_0 = K_g K_R R$$

If a fixed calibrated current $I_c$ is fed through a read-out potentiometer circuit, then the voltage V from the potentiometer moving contact to ground will be $I_c R$ and $$f_0 = K_g K_R \frac{V}{I_c} \quad (5)$$

It can be seen from Equation 5 (with $I_c$ a fixed calibrated current) that $f_0$ can be made directly readable in V by the proper potentiometer resistance and recording voltmeter.

The circuitry discussed above forms part of the embodiment of the invention shown in Fig. 2. $I_c$ is derived from two series connected D.C. voltage sources, $E_1$ and $E_2$, both of which have very low impedance. $E_1$ is a fixed voltage source and $E_2$ is an adjustable calibrated voltage source whose minimum value can be set at zero. For reading out $f_0$, $E_1$ is set at zero and $R_{ADJ}$ varied to make $I_c$ the proper value for direct read-out of $f_0$. If for the particular group of transistors under test the average value of $\alpha_0$ and K is known, then by making $$\frac{E_1 + E_2}{E_1} = \frac{1}{\alpha_0 K}$$

and leaving $R_{ADJ}$ the same, then the new voltage reading across the potentiometer contact to ground will be $$V' = \frac{V}{\alpha_0 K}$$

Since $$f_\alpha = \frac{f_0}{\alpha_0 K}$$

$f_\alpha$ will now be direct reading in the new voltage across R, namely V'. The apparatus can also, of course, be made to read $f_\alpha$ directly by calibrating $E_2$ in terms of $\alpha_0 K$ and setting the $E_2$ control at the indicated average value of $\alpha_0 K$ for the particular code of transistors being measured.

Figure 4:
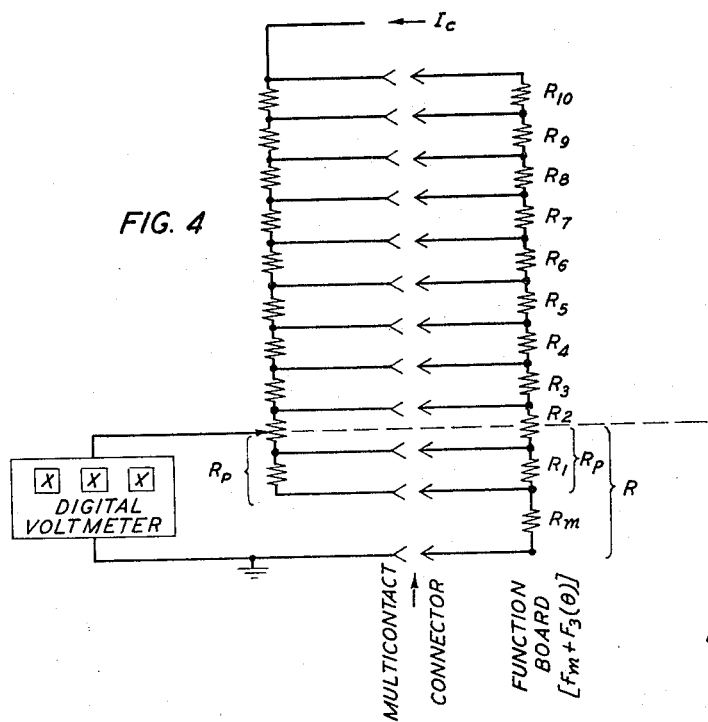
Fig. 4 shows a direct automatic digital read-out circuit suitable for use in the embodiment of the invention illustrated in Fig. 2.

With regard to making the apparatus direct reading in $f_0$ and $f_\alpha$, $f_m + F_3(\theta)$ is a function of the signal generator use and the difference in shape of transmission as a function of frequency of the reference and transistor circuits. The latter is a function of the gain characteristics as a function of frequency of both the broad-band amplifier and the particular mounting used. Now different transistor mountings will be required for different types of transistors. Furthermore, even though the broad-band amplifiers are long term stabilized by the use of well regulated power supplies, changes will occur in the event of tube failure and subsequent tube replacement. Therefore, fixed $f_m + F_3(\theta)$ function match in the potentiometer read-out circuit would be awkward at best. Instead of a fixed function match the $f_m + F_3(\theta)$ function is matched in a way which allows extremely rapid change by a plug-in function board. The circuitry of the function board is shown in Fig. 4. The function board consists of ten taps with a fixed resistor ($R_1$ to $R_{10}$) connecting each tap with the adjacent tap. The design of the function board follows from Equation 4

$$K_R R = K_R R_m + K_R R_P = f_m + F_3(\theta) = \frac{f_0}{K_\alpha} \quad (4)$$

$K_R R_m + K_R K_P$ are matched to $f_m + F_3(\theta)$ by a multi-tapped linear potentiometer which is shunted by fixed resistors between adjacent taps ($R_1$ to $R_{10}$ in Fig. 4) with $R_m$ added between the low side of the potentiometer and ground as shown. In this way $f_m + F_3(\theta)$ is matched to the precision possible with a series of straight lines across a number of equal intervals of $\theta$ equal to the number of potentiometer taps. For most purposes ten taps as shown are sufficient but a considerably larger number of taps may be used if required. By placing all fixed resistors, including $R_m$, on a function generator board with a multicontact switch provided to connect the board to the read-out potentiometer, as shown in Fig. 4, almost instantaneous change in the $f_m + F_3(\theta)$ function is possible. A separate function board would be made for each transistor and signal generator combination to be used and the appropriate function board plugged in for measurement. In the event of broad-band amplifier change caused by tube replacement, corresponding changes would have to be made in the function boards.

By connecting the read-out terminals of the potentiometer to one axis of a D.C. voltage reading XY recorder and recording the desired variable transistor operating parameter on the other axis, $f_0$ or $f_\alpha$ can be directly and continuously plotted as a function of the chosen variable transistor operating parameter. An XY recorder is, as is well known, a device in which curves relating potentials and currents are plotted directly on a chart by a pen which, in effect, has independent motion in each of two axes. The pen may, for example, be stationary in one axis while the chart moves to provide recording on that axis.

For production testing and automatic selection of transistors on the basis of cut-off frequency at a fixed operating bias, a commutated selection circuit is connected to the servo system in the manner described for the null type transistor alpha measuring set disclosed in United States Patent No. 2,847,645 issued to the present inventor on August 12, 1958. At the same time, by using an indicating digital voltmeter with provisions for card punch read-out, frequency data could be card punched for statistical quality control study. Finally, if it is desired to set limits on $f_\alpha$ over a wide range of operating biases, upper and lower limit potentiometers may be coupled to the system. The desired range of bias may then be mechanically swept out and the transistor accepted only if its frequency cut-off, as automatically indicated by the measuring set, falls within the range set by the limit potentiometers.

Figure 5:
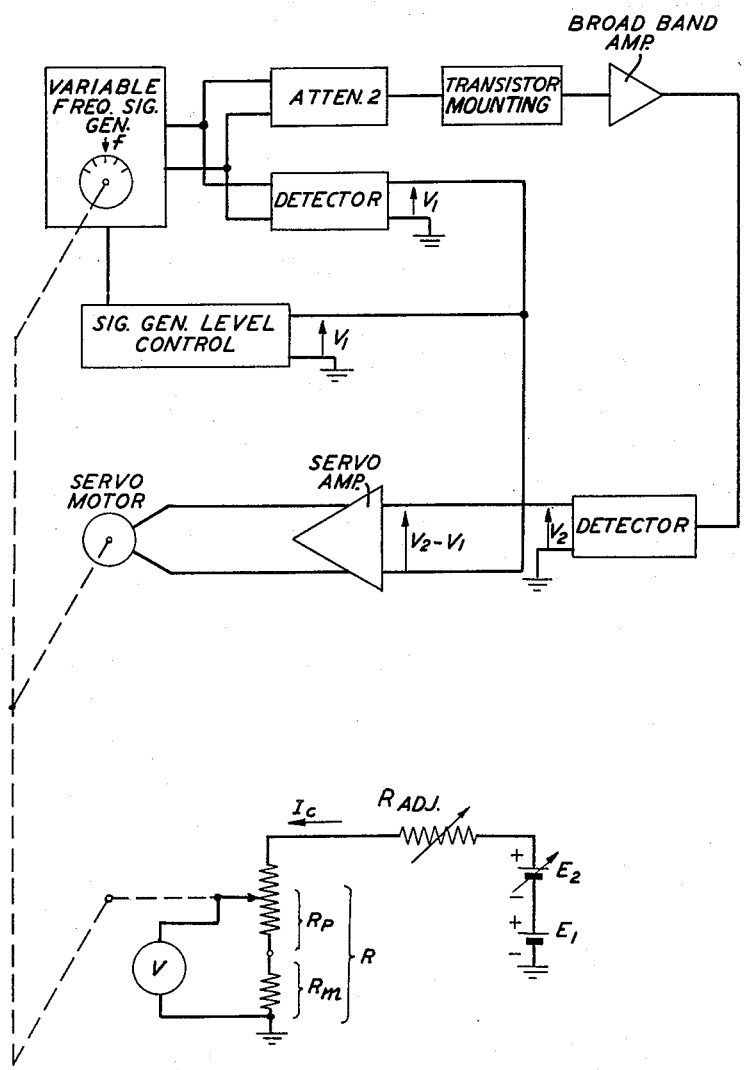
Fig. 5 shows another embodiment of the invention for automatic measurement of junction transistor cut-off frequency.

Another embodiment of the invention is shown in Fig. 5. Instead of using identical parallel paths for the transistor and reference circuits, a signal generator with signal voltage level control is being used. The direct-current control voltage from the detector at the output of the oscillator which is used to maintain the signal level constant is also available as a reference standard. This reference voltage is used for comparison with the voltage $V_2$, measured at the output of a fixed transmission reference path.

By omitting the matched reference path of Fig. 2 there is a somewhat larger range of variation of the correction factor $A' = F_2(\theta)$ with frequency. This is due to the fact that neither the transistor mounting, the broad-band output amplifier, nor the detector output, have flat gain characteristics with frequency. However, this requires only that with a constant $V_1$, the input signal current to the transistor varies in accordance with the departure of the overall transmission from a flat transmission. This variation is sufficiently small as to be well within the permissible range of signal variation of the transistor and the broad-band receiving amplifier. Furthermore, the calibration of the system of Fig. 5 required to make the system direct reading in voltage across the read-out potentiometer circuit is accomplished with the same ease as that of Fig. 2.

It is to be understood that the above-described arrangements are illustrative of the application of the principles of the invention. Numerous other arrangements may be devised by those skilled in the art without departing from the spirit and scope of the invention.

What is claimed is:

1. In combination with a transistor having an emitter electrode, a collector electrode, a base electrode, and a common-emitter short-circuit current gain versus frequency characteristic having a substantially constant slope in the region above its common-emitter cut-off frequency, an arrangement for measuring the frequency characteristics of said transistor which comprises a variable frequency alternating-current signal generator having a pair of parallel output circuits, a pair of substantially short-circuit load resistances, a reference circuit having a substantially constant loss-versus-frequency characteristic over a frequency range which includes at least a portion of the region of constant slope of the common-emitter frequency cut-off of said transistor connected between one of said output circuits and one of said load resistances, means including attenuating means for connecting said transistor in common-emitter configuration between the other of said output circuits and the other of said resistances, and means to vary the operating frequency of said signal generator until the voltages across said load resistances are equal.

2. A combination in accordance with claim 1 in which said means to vary the operating frequency of said signal generator comprises means to detect the difference between the voltages across said load resistances, a servo motor connected to vary the operating frequency of said signal generator, and means to drive said motor under the control of the detected difference between the voltages across said load resistances.

3. In combination with a junction transistor having an emitter electrode, a collector electrode, and a base electrode, an arrangement for determining the common base current amplification factor cut-off frequency of said transistor without conducting measurements at frequencies as high as said cut-off frequency which comprises a variable frequency alternating-current signal generator having a pair of parallel output circuits, a pair of detectors, means including attenuating means for connecting said transistor in common-emitter configuration between one of said output circuits and one of said detectors, means connecting the other of said output circuits to the other of said detectors, and means to vary the operating frequency of said signal generator until the outputs of said detectors are equal.

4. In combination with a junction transistor having an emitter electrode, a collector electrode, and a base electrode, an arrangement for determining the common base current amplification factor cut-off frequency of said transistor without conducting measurements at frequencies as high as said cut-off frequency which comprises a variable frequency alternating-current signal generator having a pair of parallel output circuits, a pair of detectors, an attenuator, means connecting said transistor in common-emitter configuration, means connecting said attenuator and said transistor in tandem transmission relation between one of said output circuits and one of said detectors, means connecting the other of said output circuits to the other of said detectors, and means to vary the operating frequency of said signal generator until the outputs of said detectors are equal.

5. In combination with a junction transistor having an emitter electrode, a collector electrode, and a base electrode, an arrangement for determining the common base short-circuit amplification factor cut-off frequency of said transistor without conducting measurements at frequencies as high as said cut-off frequency which comprises a variable frequency alternating-current generator having a pair of parallel output circuits, a pair of substantially short-circuit load resistances, a reference circuit having a substantially constant loss-versus-frequency characteristic over a frequency range which includes at least a portion of the region of constant slope of the common-emitter frequency cut-off of said transistor connected between one of said output circuits and one of said load resistances, means including attenuating means for connecting said transistor in common-emitter configuration between the other of said output circuits and the other of said load resistances, and means to vary the operating frequency of said signal generator until the voltages across said load resistances are equal.

6. In combination with a transistor having an emitter electrode, a collector electrode, a base electrode, and a common-emitter short-circuit current gain versus frequency characteristic having a substantially constant slope in the region above its common-emitter cut-off frequency, an arrangement for measuring the frequency characteristics of said transistor which comprises a variable frequency alternating-current signal generator having a pair of parallel output circuits, a pair of substantially short-circuit load resistances, a reference circuit having a substantially constant loss-versus-frequency characteristic over a frequency range which includes at least a portion of the region of constant slope of the common-emitter frequency cut-off of said transistor, means including attenuating means for connecting said transistor in common-emitter configuration between the other of said output circuits and the other of said resistances, and means to vary the operating frequency of said signal generator until the voltages across said load resistances are equal.

7. Apparatus as claimed in claim 6 wherein the means to vary the operating frequency of said signal generator comprises a servo system driven by the differences between the voltages across said load resistances.

8. In combination with a transistor having an emitter electrode, a collector electrode, a base electrode, and a common-emitter short-circuit current gain versus frequency characteristic having a substantially constant slope in the region above its common-emitter cut-off frequency, an arrangement for measuring the frequency characteristics of said transistor which comprises a variable frequency alternating-current signal generator having a pair of parallel output circuits, a pair of substantially short-circuit load resistances, a reference circuit having a substantially constant loss-versus-frequency characteristic over a frequency range which includes at least a portion of the region of the constant slope of the common-emitter frequency cut-off of said transistor, attenuating means connecting said reference circuit between one of said output circuits and one of said load resistances, attenuating means connecting said transistor in common-emitter configuration between the other of said output circuits and the other of said resistances, and means to vary the operating frequency of said signal generator until the voltages across said load resistances are equal.

9. Apparatus as claimed in claim 8 wherein the means to vary the operating frequency of said signal generator comprises a servo system driven by the difference between the voltages across said load resistances.

10. In combination with a transistor having an emitter electrode, a collector electrode, and a common-emitter short-circuit current gain versus frequency characteristic having a substantially constant slope in the region above its common-emitter cut-off frequency, an arrangement for measuring the frequency characteristics of said transistor which comprises a variable frequency alternating-current signal generator having a pair of parallel output circuits, a pair of matched detectors, a pair of matched broad-band amplifiers, a reference circuit with effectively short-circuited output having a substantially constant loss-versus-frequency characteristic over a frequency range which includes at least a portion of the region of constant slope of the common-emitter frequency cut-off of said transistor, the output of said reference circuit connected to one of said matched detectors by means of one of said broad-band amplifiers, attenuating means connected the input of said reference circuit to one of said signal generator output paths, attenuating means connecting said transistor in common-emitter configuration to the other signal generator output, the effectively short circuited output of the transistor applied to the other matched detector by means of the other matched broad-band amplifier, a servo system to vary the operating frequency of said signal generator until the output voltages of said matched detectors are equal, a read-out potentiometer mechanically coupled to said servo motor, a variable voltage and a fixed voltage connected in series through an adjustable resistor to said read-out potentiometer, a voltmeter connected to said read-out potentiometer, and the potentioameter calibrated so that the voltmeter gives a direct numerical reading of the frequency of unity common-emitter short-circuit current gain or common-base cut-off frequency.

11. Apparatus as claimed in claim 10 which includes a commutated selection circuit connected to the servo system to reject transistors whose common-emitter unity current gain or cut-off frequency fall outside a predetermined range of values.

12. In combination with a transistor having an emitter electrode, a base electrode, a collector electrode and a common-emitter short-circuit current gain versus frequency characteristic having a substantially constant slope in the region above its common-emitter cut-off frequency, an arrangement for measuring the frequency characteristics of said transistor which comprises a unit oscillator with signal voltage level control and with direct-current control voltage from a first detector at the output of the oscillator for use as a reference standard, attenuating means connected to the output of said unit oscillator, a broad-band amplifier, a second detector, the transistor to be tested connected in common-emitter configuration to said second detector by means of said amplifier and connected to said unit oscillator by said attenuater, a servo system to vary the operating frequency until the voltage of the reference standard and the second detector output are equal, a read-out potentiometer mechanically coupled to said servo motor, a variable voltage and a fixed voltage connected in series through an adjustable resistor to said read-out potentiometer, and a voltmeter connected to said read-out potentiometer and calibrated in terms of unity common-emitter short-circuit current gain and common-base frequency.

13. Apparatus as claimed in claim 12 wherein a commutated selection circuit is connected to the servo system so that transistors whose common-emitter unity current gain or cut-off frequency fall outside a predetermined range are rejected.

References Cited in the file of this patent
UNITED STATES PATENTS
2,847,645   Thomas _____ Aug. 12, 1958